(12) United States Patent
Wadleigh

(10) Patent No.: US 8,496,408 B1
(45) Date of Patent: Jul. 30, 2013

(54) SPRING LOCK CULVERT PIPE LINER

(75) Inventor: Robert Wadleigh, Melbourne, FL (US)

(73) Assignee: Spring Lock Liners, LLC, Melbourne, FL (US)

( * ) Notice: Subject to any disclaimer, the term of this patent is extended or adjusted under 35 U.S.C. 154(b) by 103 days.

(21) Appl. No.: 13/117,566

(22) Filed: May 27, 2011

Related U.S. Application Data

(60) Provisional application No. 61/351,632, filed on Jun. 4, 2010.

(51) Int. Cl.
*F16L 55/18* (2006.01)
(52) U.S. Cl.
USPC .................. 405/184.2; 405/124; 138/129
(58) Field of Classification Search
USPC ............ 405/124, 126, 184.1, 184.2; 138/129, 138/109; 403/292, 335, 336
See application file for complete search history.

(56) References Cited

U.S. PATENT DOCUMENTS

| | | | |
|---|---|---|---|
| 1,263,340 A | 4/1918 | Silk | |
| 1,512,802 A | 7/1921 | Robertson | |
| 2,143,072 A | 1/1939 | Johnson | |
| 2,354,485 A * | 7/1944 | Slaughter | 52/578 |
| 3,358,769 A | 12/1967 | Berry | |
| 3,895,652 A | 7/1975 | Zach | |
| 4,383,555 A | 5/1983 | Finley | |
| 4,501,327 A | 2/1985 | Retz | |
| 4,589,447 A | 5/1986 | Kane | |
| 4,647,072 A | 3/1987 | Westman | |
| 4,819,972 A * | 4/1989 | Champa et al. | 285/331 |
| 5,101,863 A | 4/1992 | Fujii | |
| 5,119,862 A | 6/1992 | Maimets | |
| 5,186,215 A | 2/1993 | Gilleland | |
| 5,571,349 A | 11/1996 | Nakazawa | |
| 5,626,442 A * | 5/1997 | Boyer | 405/303 |
| 6,516,506 B2 | 2/2003 | Donnelly | |
| 2002/0129862 A1 | 9/2002 | Hupertz | |
| 2004/0013472 A1 | 1/2004 | Akimoto | |
| 2005/0241709 A1 | 11/2005 | Johnson | |
| 2009/0226664 A1 * | 9/2009 | Heindl | 428/100 |

FOREIGN PATENT DOCUMENTS

JP    03190720    * 8/1991

OTHER PUBLICATIONS

Wadleigh, International Search Report received from the Patent Office for PCT/US11/39050, 9 pages, Date of mailing of search report: Oct. 5, 2011.

* cited by examiner

*Primary Examiner* — Sean Andrish
(74) *Attorney, Agent, or Firm* — Brian S. Steinberger; Law Offices of Brian S. Steinberger, P.A.

(57) ABSTRACT

Devices, apparatus, systems and methods for forming rolled up spiral shaped tubular inserts of interlocking seams of elongated strip material and for inserting the inserts into damaged channels such as damaged culverts, sewer lines, pipes, and the like. The inserts are released to expand outward and unravel until the walls of the unraveling insert abut against interior walls of the damaged channel forming a protective interior wall for the damaged channel. One side of the insert strips can have a hook, and an opposite side of the strips can have a longitudinal groove wherein the hook attaches to and slides within the groove. Slidable surfaces such as bushings, Teflon coatings and O-rings can be used along the interlocking seams to allow for reduced friction as the strip materials are rolled into contracted positions and later expanded out.

16 Claims, 13 Drawing Sheets

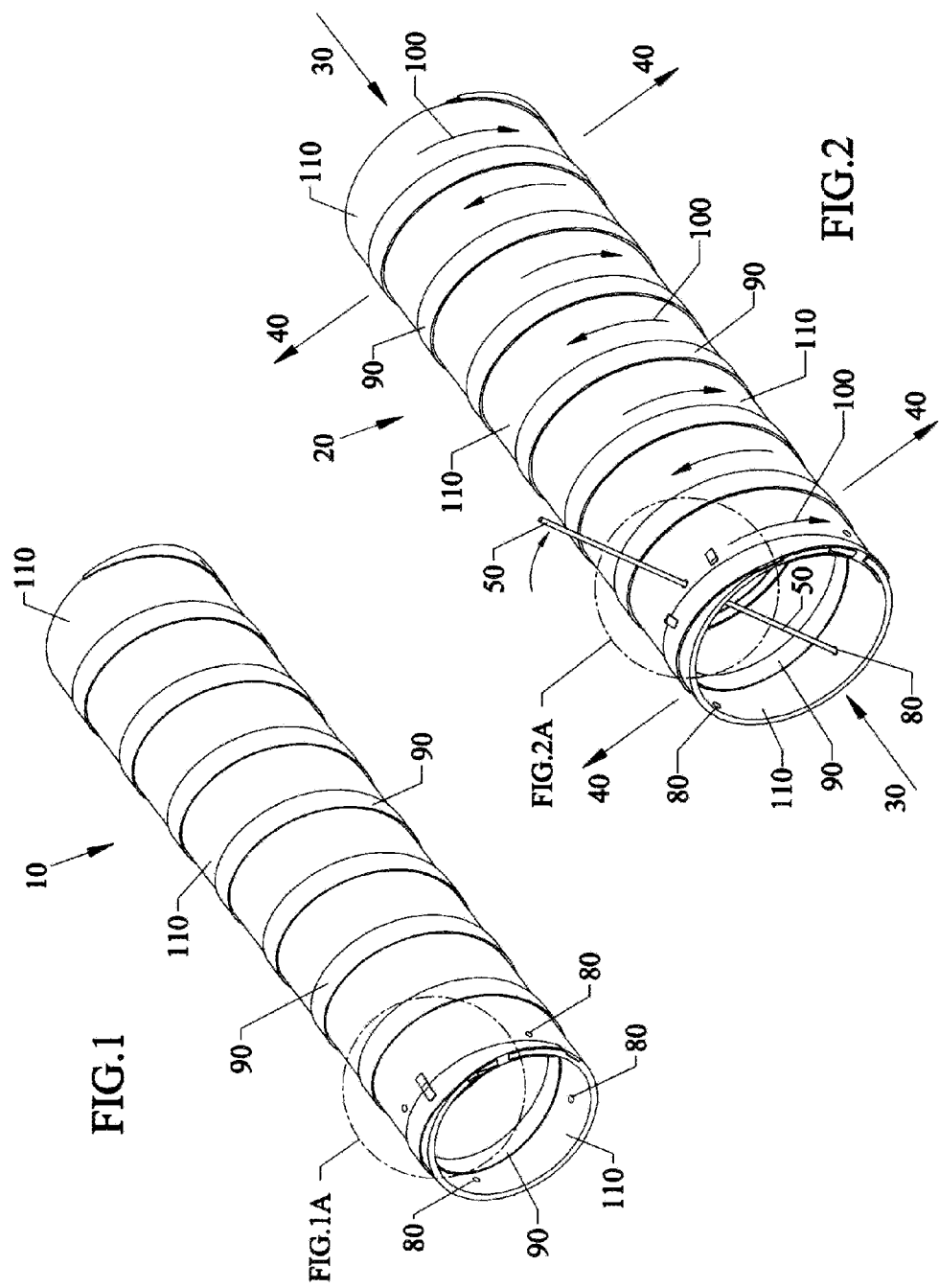

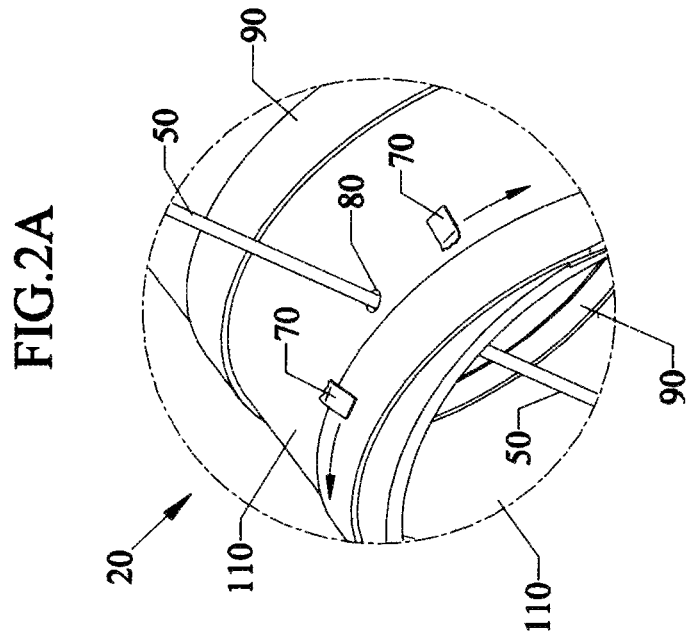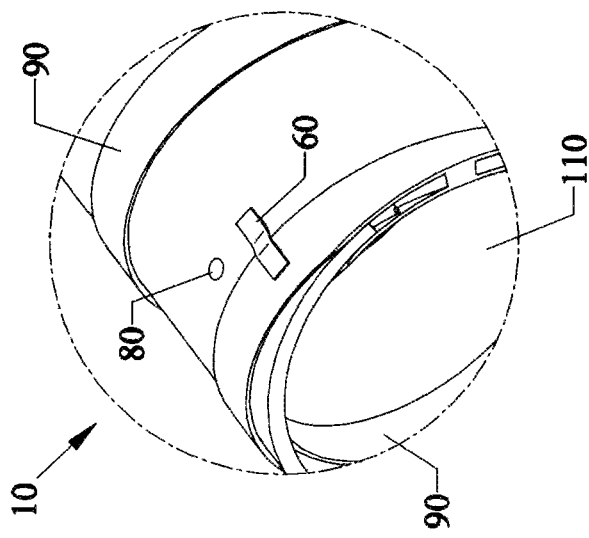

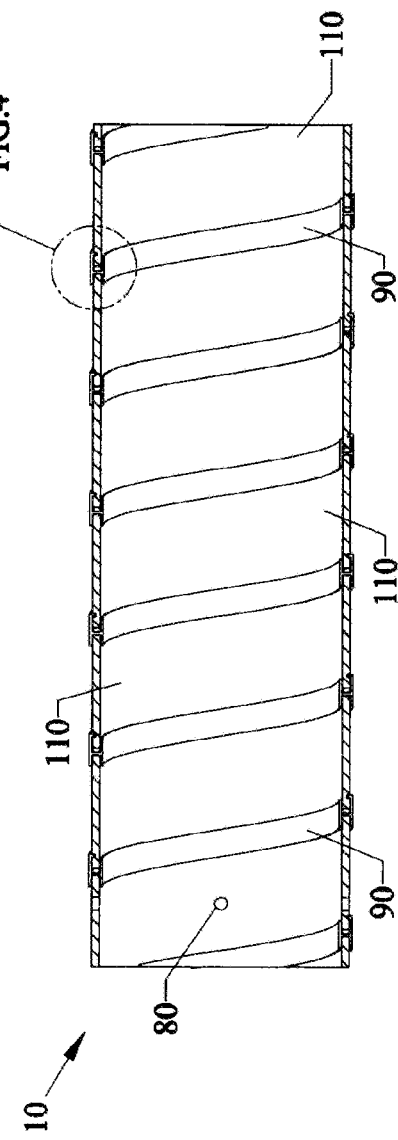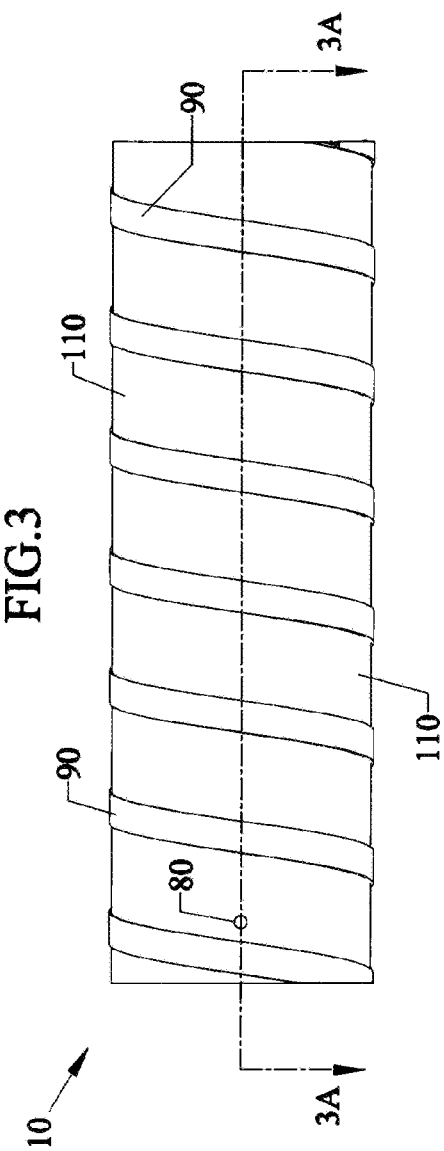

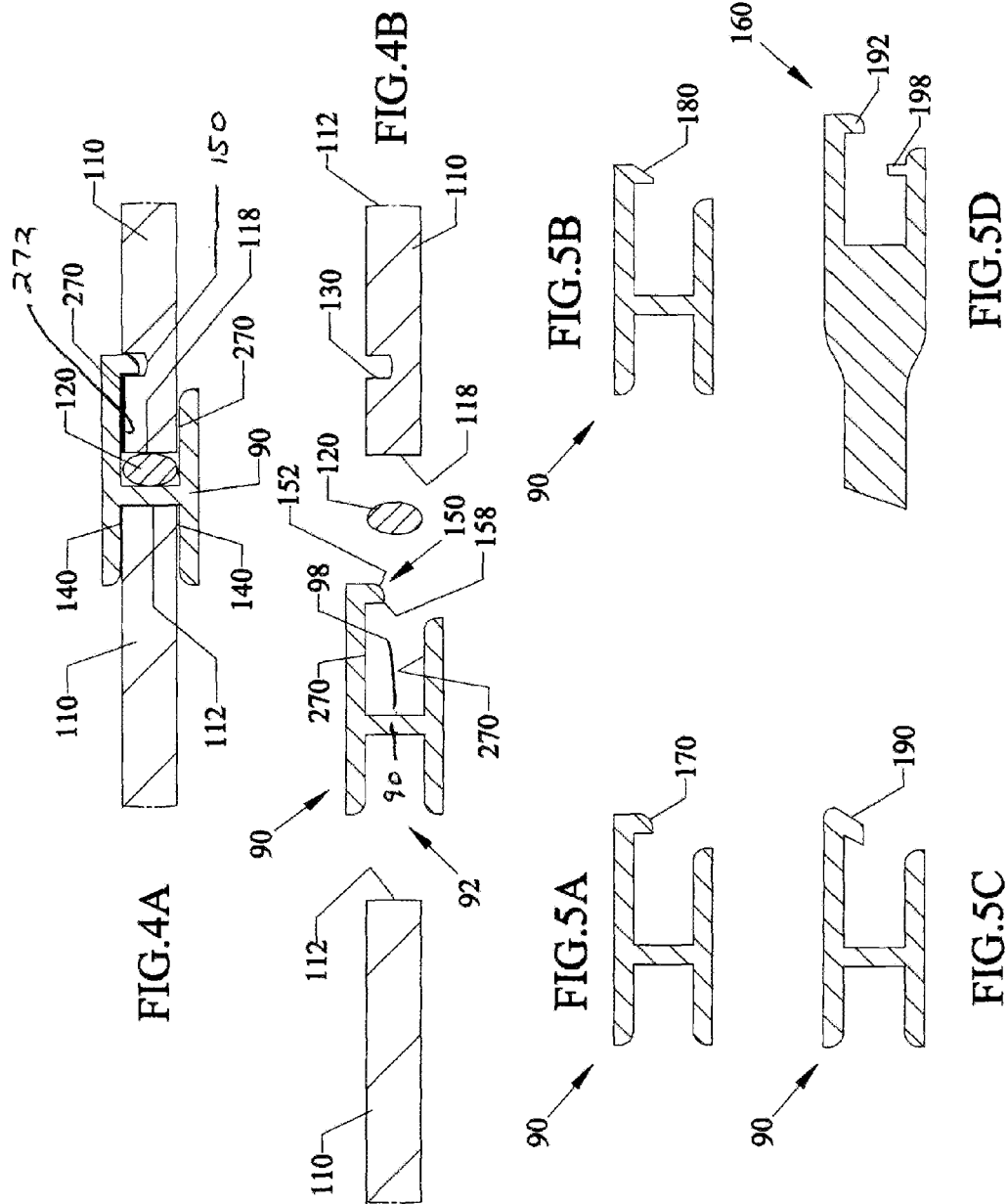

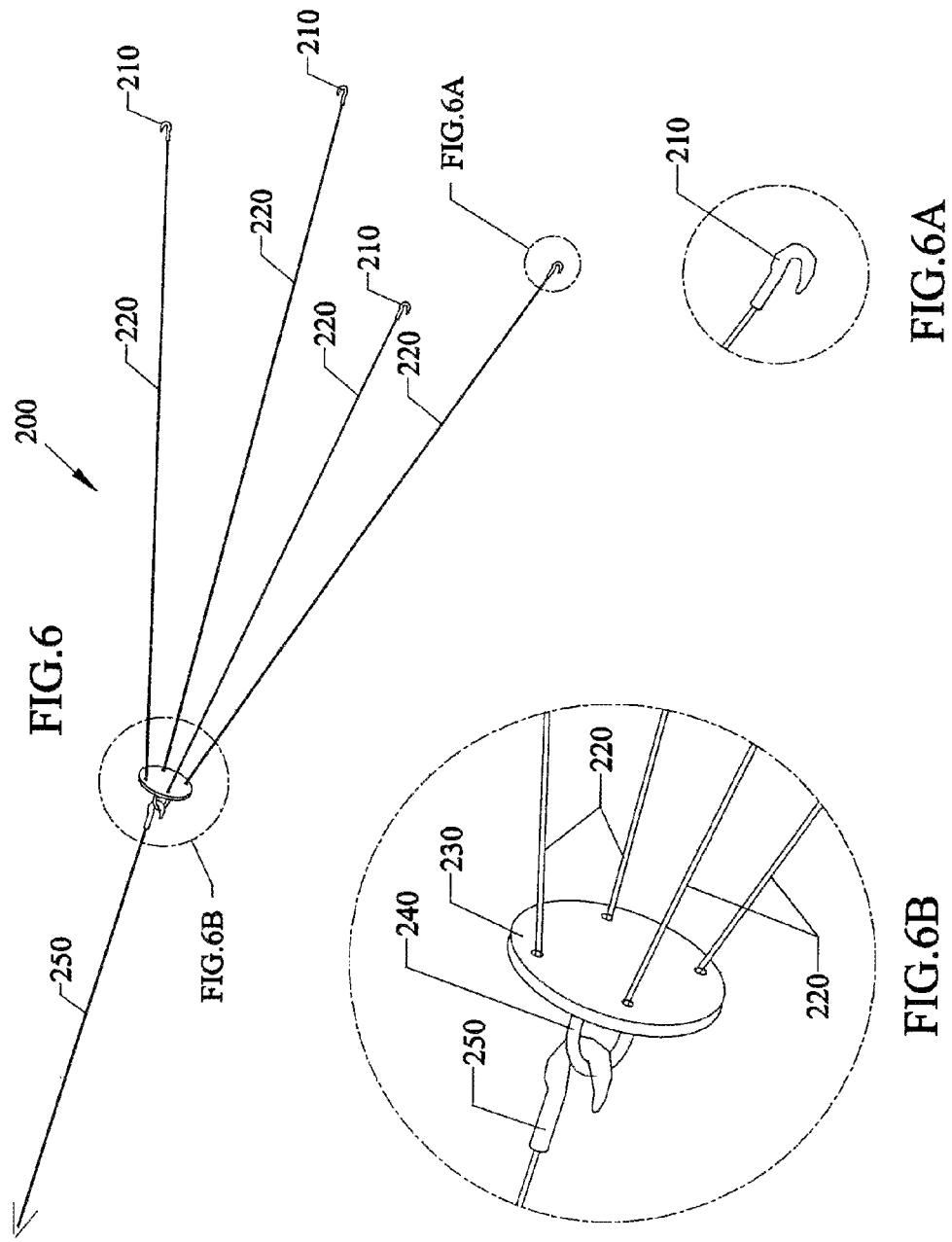

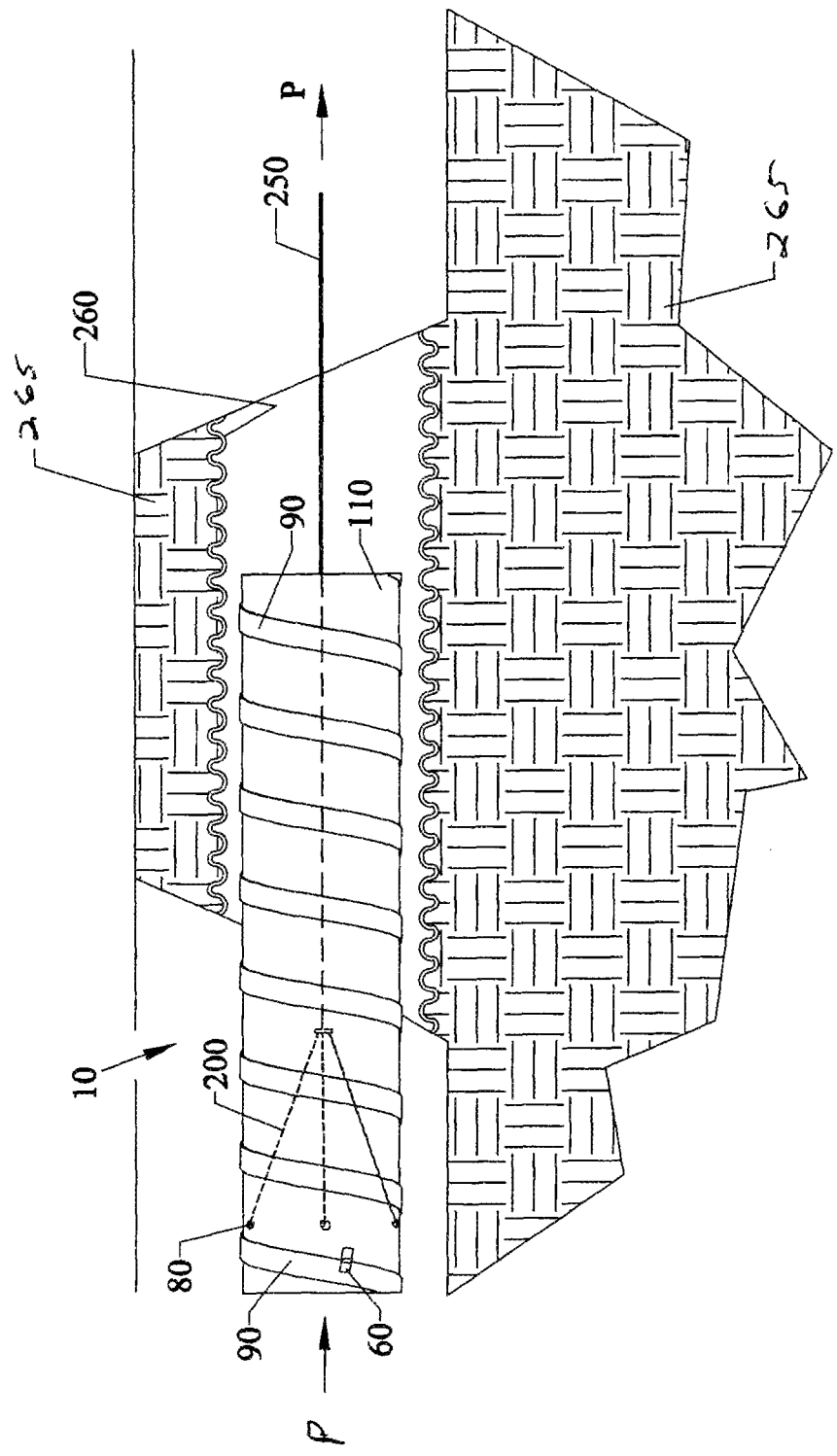

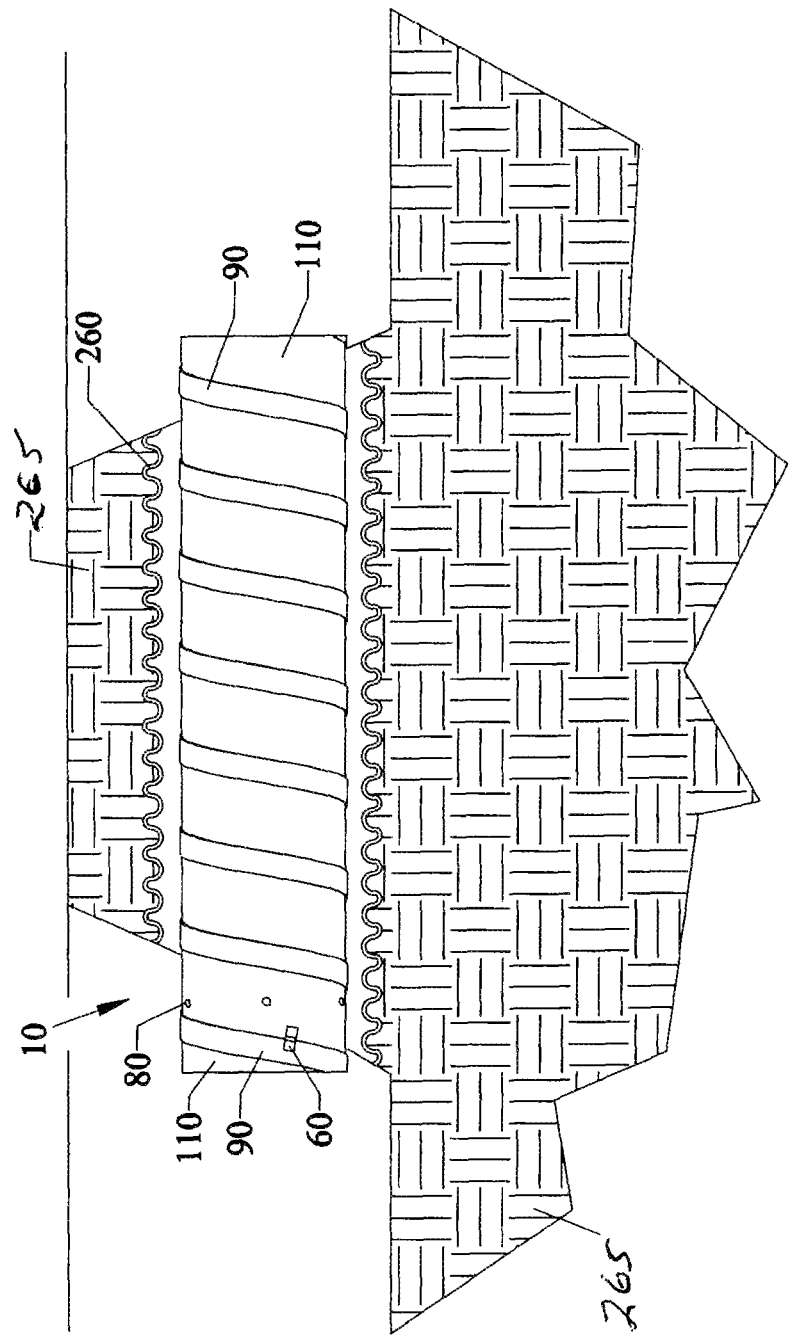

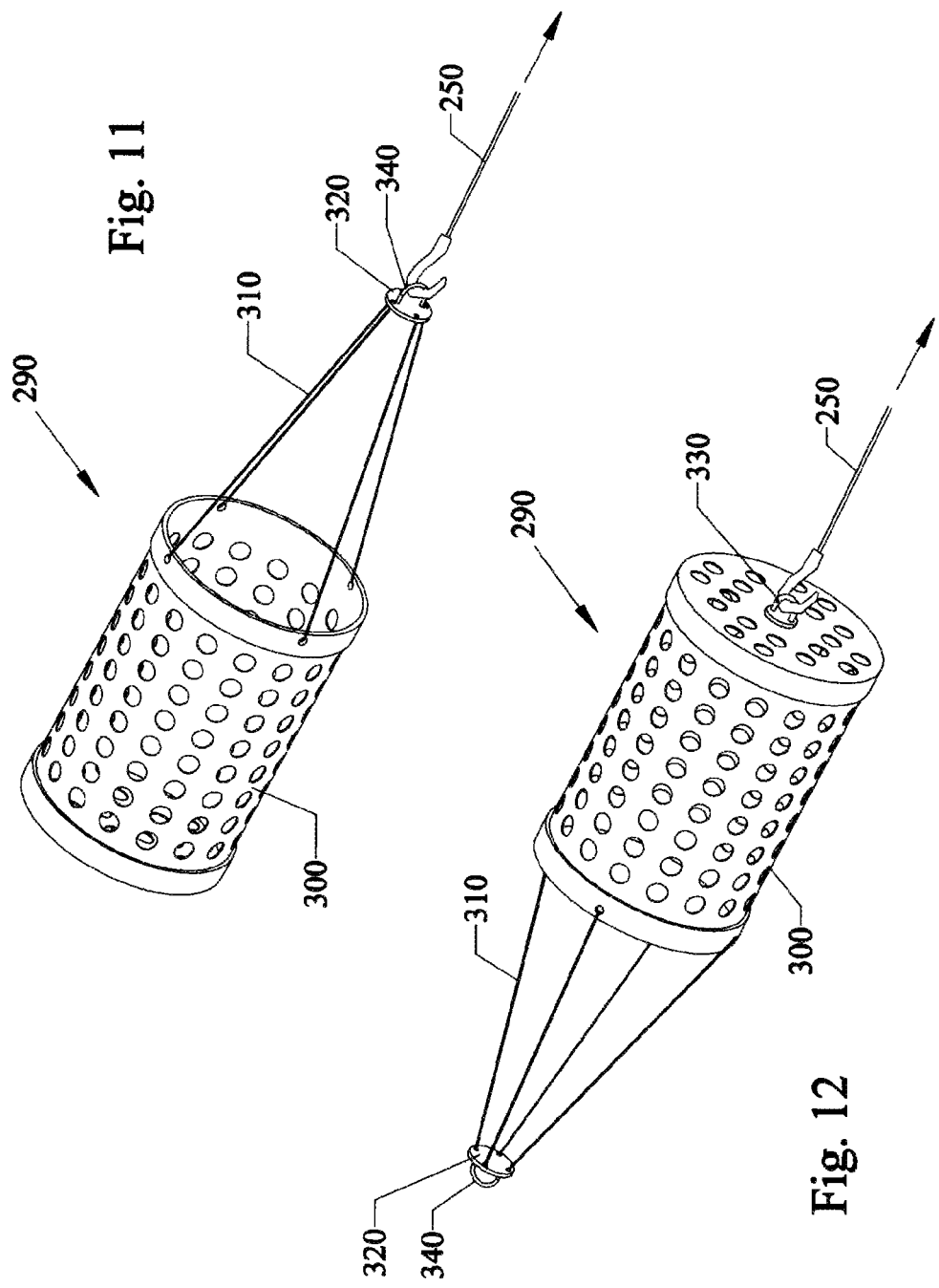

SPRING LOCK CULVERT PIPE LINER

This invention claims the benefit of priority to U.S. Provisional Application Ser. No. 61/351,632 filed Jun. 4, 2010.

FIELD OF INVENTION

This invention relates to culverts, in particular to apparatus, devices, systems and methods of making spiral cut pipe materials into expandable inserts for damaged channels such as culverts, drainage canals, sewer lines, pipes, and the like, and installing a spiral cut pipe liner insert into the channels, and expanding the insert to become an pipe liner for the damaged channel that can be used under driveways, sidewalks and roadways, and the like.

BACKGROUND AND PRIOR ART

Culverts are permanent structures that are generally installed underneath driveways, sidewalks, and roadways to allow for storm water drainage. These permanent structures are often formed from materials such as concrete, steel, combinations, thereof, and the like, and are intended to last for many years. However, these culverts and pipes do not last forever, and can crumble and collapse after many years of use.

Since the culverts are considered to be permanent solid structure, cracks are only repaired with temporary patches and are not done for long lasting effects. After years of use and damage, the culverts usually need to be replaced when their life has run out. Currently, it is a very costly endeavor to have to physically dig up the driveways, sidewalks, roadways etc. in order to install new culverts when the old ones are needed to be replaced. Additionally, replacing a culvert can take up to a couple of days or more time which can result in the driveways, sidewalks, and roadways around the culverts not able to be used. Culvert repairs can require multiple permits and large amounts of labor and material costs. In addition, businesses and travelers have to detour about the areas where the culverts are being replaced causing further delays and hardships.

Thus, the need for solutions to the above problems with the prior art.

SUMMARY OF THE INVENTION

A primary objective of the present invention is to provide apparatus, devices, systems and methods of fixing damaged culverts by leaving the existing culverts in place.

A secondary objective of the present invention is to provide apparatus, devices, systems and methods of fixing damaged culverts that is substantially less expensive than having to remove and replace the existing culvert.

A third objective of the present invention is to provide apparatus, devices, systems and methods of fixing damaged culverts that takes substantially less time than having to remove and replace the existing culvert.

A fourth objective of the present invention is to provide apparatus, devices, systems and methods of fixing damaged culverts that is substantially less disruptive to vehicle and pedestrian traffic than having to remove and replace the existing culvert.

A preferred embodiment of the culvert insert can include a spiral cut pipe material, with cut sections hooked together along the seam lines with one another. Initially, a PVC type pipe can be cut along a spiral line from one end of the pipe to the other. Next, the separated spiral cut sections (or strips) can be joined together by a sliding hook, into an expandable or contractable pipe insert. The insert can be placed inside of a damaged culvert and then twisted to expand against the interior walls of the damaged culvert. Twisting the insert in a clockwise direction contracts the diameter of the insert, and lengthens the insert. Twisting the insert counter-clockwise at a job site (inside of a damaged culvert) expands the insert against interior walls of the damaged culvert and shortens the length of the insert.

A culvert insert can include an elongated rectangular strip of semi-rigid planar material having longitudinal sides, with at least one side having an elongated hook, and an opposite side having a longitudinal groove running therethrough, where the hook slidably attaches to and slide within the longitudinal groove when the strip is rolled into a spiral wrapped tube.

The elongated rectangular strip can be formed from PVC. The elongated hook can include an elongated seam having one side that is attached to the one side of the rectangular strip, and the seam edge having another side with the hook thereon.

The culvert insert can include a lock attached to at least one end of the spiral wrapped tube that keep the tube in a contracted rolled state. The culvert insert can include an opening in at least one end of the spiral wrapped tube to allow for a lever to be inserted in order to allow the culvert insert to expand.

The elongated seam can include a compressible and expandable O-ring for allowing the one side to slide against an opposite side of the strip.

The hook edge can include a finger portion protruding substantially perpendicular to the strip. The finger portion can include a substantially sharpened tip. The finger portion can include a substantially rounded tip. The finger portion can include an angled tip. The finger portion can include a pair of substantially perpendicular finger portions each facing one another.

A method of repairing a damaged culvert, can include the steps of inserting a rolled up tube into a damaged culvert, releasing the rolled up tube to unravel, expanding the unraveling tube, locking the expanding tube to interior walls of the culvert to form a protective lining for the inside of the culvert.

The method can further include the step of rolling an elongated strip of a rigid material into a spiral shape to form the rolled up tube before the inserting the tube in the culvert. The method can further include the step of slidably interlocking hook edges about longitudinal sides of the strip with one another while the strip is being rolled into the spiral shape.

The method can further include the step of providing a slidable surface on the hook edges, the slidable surface being selected from one of an O-ring, a bushing and a TEFLON® coating.

The releasing step can include the step of removing a lock about the at least one end of the rolled up tube.

The method can include the step of slidably attaching the hook edge into an elongated groove. The hook edges can include a substantially perpendicular finger portion. The hook edges can include a pair of substantially perpendicular finger portions each facing one another.

Further objects and advantages of this invention will be apparent from the following detailed description of the presently preferred embodiments which are illustrated schematically in the accompanying drawings.

BRIEF DESCRIPTION OF THE FIGURES

FIG. 1 is a perspective view of the expandable culvert insert in a contracted configuration.

FIG. 1A is an enlarged view of a portion of the expandable culvert insert of FIG. 1.

FIG. 2 is another perspective view of the expandable culvert insert of FIG. 1 in an expanded configuration.

FIG. 2A is an enlarged view of the expandable culvert insert portion of FIG. 1.

FIG. 3 is a side view of the culvert insert of FIG. 1 in an expanded configuration.

FIG. 3A is a side cross-sectional view of the culvert insert of FIG. 3 along arrows 3A.

FIG. 4A is an enlarged view of the connecting strip with o-ring seal and connecting strip retaining groove in the expandable culvert insert of FIG. 3A.

FIG. 4B is an exploded view of the connecting strip, o-ring seal and connecting strip retaining groove of FIG. 4A.

FIG. 5A is a cross-sectional view of another connecting strip seam for the invention.

FIG. 5B is a cross-sectional view of still another connecting strip seam for the invention.

FIG. 5C is a cross-sectional view of still another connecting strip seam for the invention.

FIG. 5D is a cross-sectional view of still another connecting strip seam for the invention.

FIG. 6 is a perspective view of culvert installation bridle for the invention.

FIG. 6A is an enlarged view of bridle hook for the bridle of FIG. 6 that is used to secure to a hole in a culvert insert wall.

FIG. 6B is an enlarged view of a cable hooked to a plate for the bridle of FIG. 6.

FIG. 7 is a cross-sectional view of a damaged culvert being installed with the expandable culvert insert being pulled into the culvert.

FIG. 8 is another cross-sectional view of the damaged culvert with culvert insert in a position ready to be expanded.

FIG. 11 is a front perspective view of a pipe cleaning bucket which is pulled through the old culvert prior to installation of the culvert insert.
in order to clear debris for the installation of the expandable culvert.

FIG. 12 is a rear perspective view of the pipe cleaning bucket of FIG. 11 showing winch cable affixed to the bottom ring.

DESCRIPTION OF THE PREFERRED EMBODIMENTS

Figure 1B:
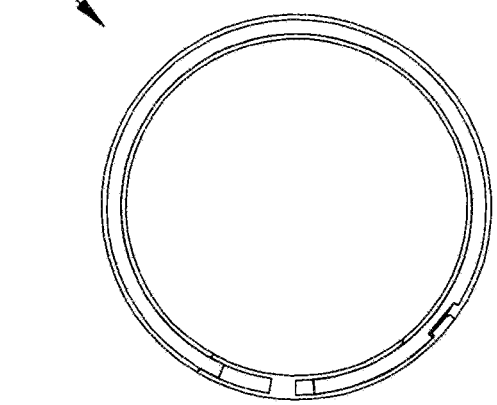
FIG. 1B is an end view of the expandable culvert of FIG. 1 in contracted position.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

A listing of components will now be described.
10 Expandable culvert insert in contracted configuration.
20 Expandable culvert insert in expanded configuration.
30 Axial contraction motion.
40 Radial expansion motion.
50 Lever rod to help the culvert insert to expand.
60 Shipping lock.
70 Shipping lock has been cut to allow the spiral sections to slide against each other.
80 Holes in culvert insert wall to fit lever rod into so that lever can be used to twist and expand culvert insert.
Also used to attach bridle hooks and pull culvert insert into position inside of old culvert.
98 Opposite side of connecting seam
90 Connecting strip seam.
100 Twisting motion that expands culvert insert.
110 Culvert insert wall.
112 one edge of insert wall
118 opposite edge of insert wall
120 O-Ring seal.
130 Connecting strip retaining groove in culvert insert wall.
140 Connecting strip is glued onto culvert insert wall on one side of seam.
150 Connecting strip retaining finger locks connecting strip into to groove in culvert insert wall while allowing the strip to slide along the wall when the culvert insert is twisted to expand.
152 indented outer portion of finger tip 158 enlarged rear base portion of finger tip 160 Optional configuration. Connecting strip molded as part of the culvert insert wall.
170 Rounded lead on retaining finger allows assembly of strip to culvert insert wall.
180 Alternate configuration on retaining finger.
190 Alternate configuration on retaining finger with hook molded to strip.
192 downwardly facing prong finger
198 upwardly facing prong finger
200 Installation bridle bridal used to pull culvert into position before expanding.
210 Bridle hook secures to hole in culvert wall.
220 Bridle cable fixes hook to bridle plate.
230 Bridle plate.
240 Ring fixed to bridle plate to attach winch cable hook onto.
250 Winch cable with hook (prior art).
260 Existing damaged culvert within soil/ground.
265 Soil/ground surrounding culvert
270 Upper and lower legs
272 Lubricant to ease sliding of culvert wall against connecting strip.
280 Culvert cut off to conform to the shape of the existing installation.
290 Pipe cleaning bucket.
300 Bucket.
310 Bucket cables connect bucket to bucket plate.
320 Bucket plate.
330 Ring fixed to bottom of bucket allows bucket to be pulled out of the culvert backwards to empty the bucket or clear a snag.
340 Ring fixed to bucket plate allows bucket to be pulled through old culvert to clear debris.
350 Debris in old culvert installation.

A preferred length of the installed culvert insert for residential use can be approximately 10 feet to approximately 40 feet, and having diameters of approximately 4 inches to approximately 8 feet. Shorter lengths can also be used. For an approximately 30 foot length existing culvert, having approximately 24 inches a preferred embodiment of the culvert can be twisted to approximately 20 inches in width. A single strip can have width of approximately 12 inches to approximately 16 inches in width before being rolled up in a spiral configuration.

For a residential application, the strips can be formed from extruded PVC (polyvinyl chloride) and/or ABS (acrylonitrile butadiene styrene) plastic. Other types of material can be formed from composite material that can include composites, fiberglass, combinations, and the like.

A machine can be used roll up the strips in a spiral pattern where each of the connecting strips is being rolled up into a spiral type roll configuration. For example, a rolling machine can be used for the PVC strips, and/or an extruding machine can be used for PVC, plastics, composites and the like. Likewise, an extruding machine can be used plastics, composites and the like.

FIG. 1 is a perspective view of the expandable culvert insert 10 in a contracted configuration. FIG. 1A is an enlarged view of a portion of the expandable culvert insert 10 of FIG. 1. FIG. 1B is an end view of the expandable culvert 10 of FIG. 1 in contracted position.

Figure 2B:
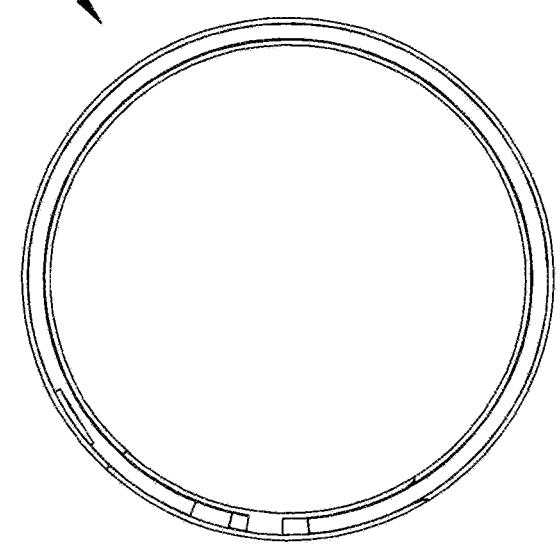
FIG. 2B is an end view of the expanded expandable culvert insert of FIG. 2.

FIG. 2 is another perspective view of the expandable culvert insert 10 of FIG. 1 in an expanded configuration 20. Axial and radial motion arrows are shown to illustrate that the culvert is getting shorter and wider. FIG. 2A is an enlarged view of the expandable culvert insert portion of FIG. 1. FIG. 2B is an end view of the expanded expandable culvert insert of FIG. 2.

FIG. 3 is a side view of the culvert insert 10 of FIG. 1 in an expanded configuration. FIG. 3A is a side cross-sectional view of the culvert insert 10 of FIG. 3 along arrows 3A.

FIG. 4A is an enlarged view of the connecting strip 110 with O-ring seal 120 and connecting strip retaining groove 130 in the expandable culvert insert 110 of FIG. 3A.

FIG. 4B is an exploded view of the connecting strip 110, O-ring seal 120 and connecting strip retaining groove 130 of FIG. 4A.

Referring to FIGS. 1-4B, the culvert insert 10 can include an elongated culvert strip 110 having one edge 112 with a connecting strip seam 90 having a hook 130, fixably attached thereto, and an opposite edge 118 with a longitudinal groove 130 into a side of the culvert wall strip 110. The connecting seam 90 can have an H-configuration, with one side 92 having a C shape (or parallel arms) 140 that can attach to the one edge 112 of the strip 110 by an adhesive, such as but not limited to glue, contact cement, and the like. As shown in FIG. 4A, parallel arms 14 can sandwich edge 112 of strip 110 therebetween limiting substantial lateral movement of the strip 110. The opposite side 98 of the connecting seam 90 can have upper and lower legs 270, with at least the upper leg having an inwardly protruding finger portion 150. The inwardly protruding finger portion 150 locks the connecting strip seam 90 into the groove 130 in culvert insert wall 110 while allowing one edge 112 of the strip 110 with attached seam 90 to slide along the other edge 118 of the strip 110 when the culvert insert 10 is twisted to expand.

The tip of the finger 150 can have an indented outer portion 152, and an enlarged rear base portion 158, where the indented outer portion 152 enhances the sliding of the finger 150 within the groove 130. A lubricant 272 can be inserted within the right C shape legs 270 to ease in sliding of the culvert strip edge 118 against the inside of the C shape legs 98 of the connecting strip seam 90.

Referring to FIGS. 1-3, a shipping lock 60 can be used to adhere at least the adjoining strips at one end of the culvert insert 10 together, which will hold a wound up culvert insert 10 into a generally pipe shaped configuration. The lock 60 can be tape or another type of band that adheres to both adjoining strips. When the culvert insert 10 is to be used, the shipping lock 60 is cut 70 to allow the spiral wrapped strips 110 to slide against each other, and rotate opposite to one another.

A hole 80 in at least one of the walls of the culvert strips 110 can allow use of a lever rod 50 to be inserted into. The lever rod 50 can be moved in the direction of arrow R to help the culvert insert 10 expand into an expanded version 20. Arrows 40 show the radial expansion of the culvert insert 10 into the expanded position 20 while the axial dimension of the culvert insert contracts as shown by arrows 30.

Working prototypes of the invention were constructed between August and October 2010, and resulted in demonstrating the H seam functioned and operated to hold the wound strips together in a spiral pipe configuration to be used as a culvert insert.

FIG. 5A is a cross-sectional view of another connecting strip seam 90 for the invention where the tip has an outer rounded lead 170 on the retaining finger which allows easier sliding of the strip 110 to the groove 130. FIG. 5B is a cross-sectional view of still another connecting strip seam 90 for the invention with an angled side 180. FIG. 5C is a cross-sectional view of still another connecting strip seam 90 for the invention with an inwardly angled finger 190. FIG. 5D is a cross-sectional view of still another connecting strip seam 160 for the invention with the connecting seam molded onto one side of the culvert wall 100. A still another alternative connecting seam can have a two fingers (an upper one 192 and a lower one 198, each inwardly protruding and facing one another.

FIG. 6 is a perspective view of culvert installation bridle 200 for the invention that can be used to pull the culvert insert 10 into position before expanding. FIG. 6A is an enlarged view of a bridle hook 210 of the bridle 100 of FIG. 6. FIG. 6B is an enlarged view of a winch cable 250 that is attached to a ring 240 fixed to a bridle plate 230, where a plurality of bridle cables 220 are attached thereto. At the end of each bridle cable 220 can be a bridle hook 210.

FIG. 7 is a cross-sectional view of an existing damaged culvert 260 being installed with the expandable culvert insert 10 being pulled into the damaged culvert 260.

Referring to FIGS. 6-7, bridle hooks 210 at the end of the plurality of bridle cables 220 can be attached to holes 80 along a circumferential perimeter of the rear of the culvert insert, while the winch cable 250 passes through the inside of the culvert insert 10 and can be pulled in the direction of arrow P through the inside of a damaged culvert 260 located within soil/ground 265.

FIG. 8 is another cross-sectional view of the damaged culvert 260 with culvert insert 10 centered in a position ready to be expanded.

Figure 9:
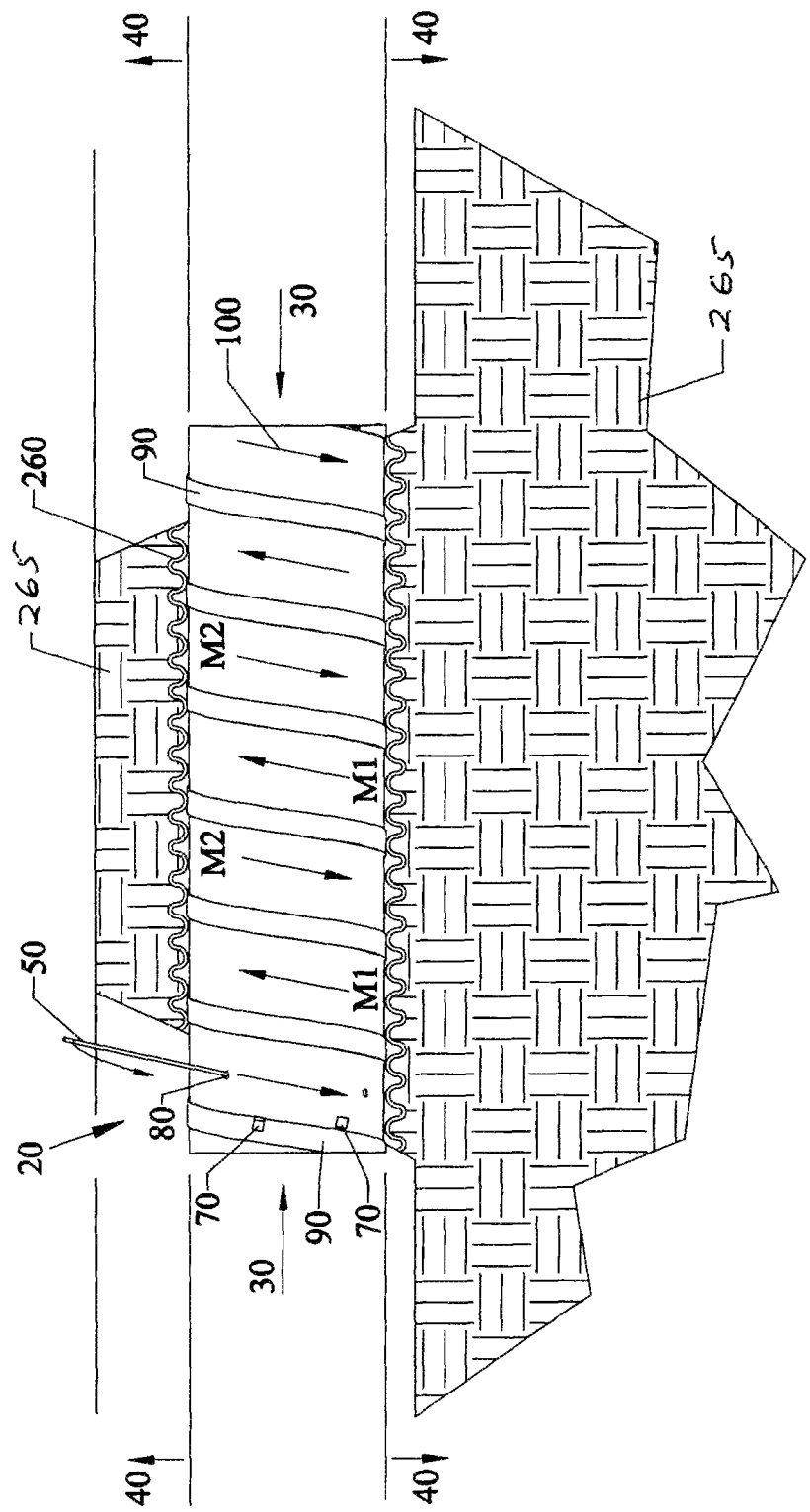
FIG. 9 is another cross-sectional view of the culvert insert being expanded into place.

FIG. 9 is another cross-sectional view of the culvert insert 10 being expanded into an expansion position 20 with the lever rod 50 being inserted into an opening 80 and rotated in order to help culvert insert 10 twist and expand outward. Motion arrows M1, M2 indicate the culvert insert 10 getting shorter in length (arrow 30) and wider in diameter arrows 40.

Figure 10:
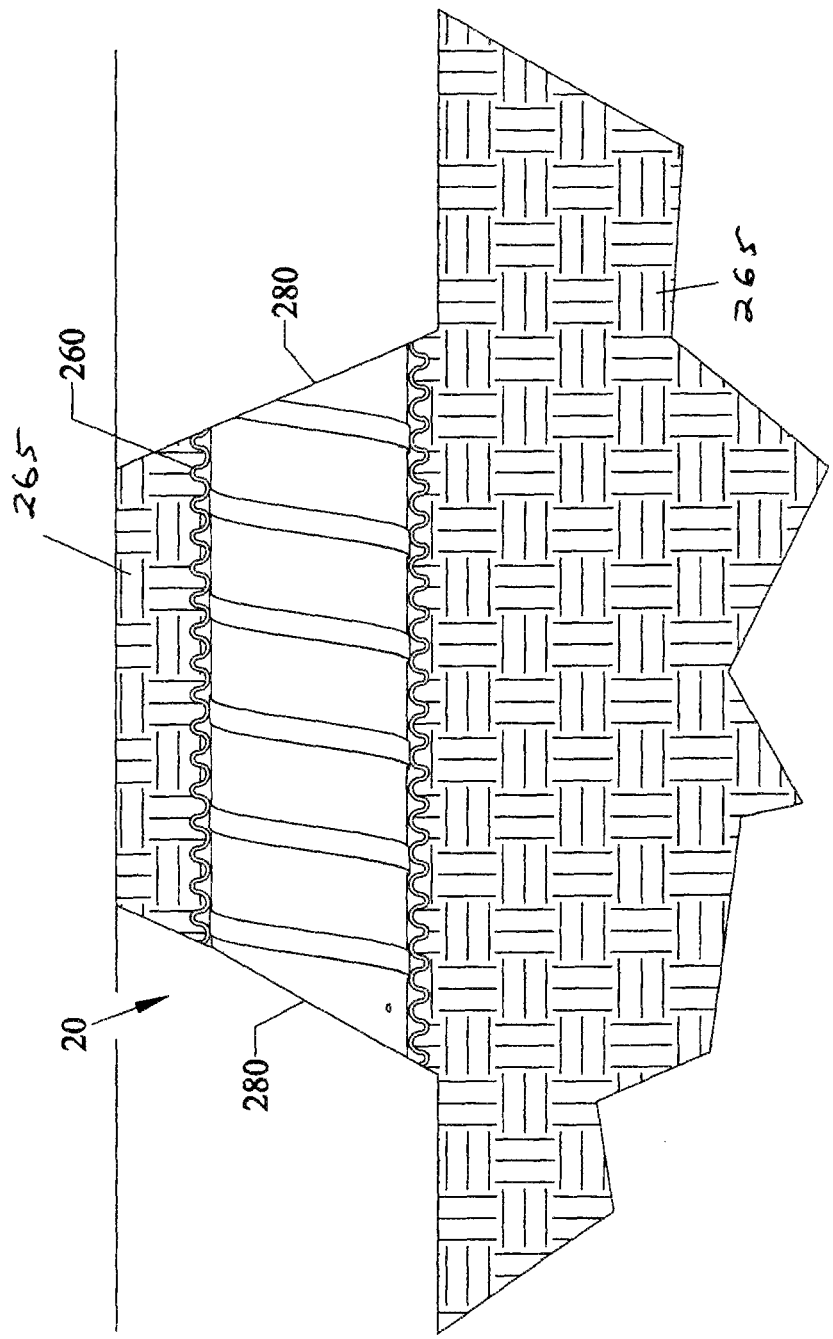
FIG. 10 is a cross-sectional view with the culvert insert fully expanded into place and the ends cut off to conform to the old exterior walls.

FIG. 10 is a cross-sectional view with the culvert insert 10 fully expanded into place 20 and the ends of the culvert insert 10 cut off at 280 to conform to the old exterior walls of the damaged culvert 260.

FIG. 11 is a front perspective view of a pipe cleaning bucket 290 which is pulled through the old culvert prior to installation of the culvert insert 10. FIG. 12 is a rear perspective view of the pipe cleaning bucket 290 of FIG. 11 showing winch cable 250 affixed to the bottom ring 330.

The pipe cleaning bucket 290 can include a generally cylindrical bucket 300 formed out of plastic, aluminum, galvanized metal, and the like having perforations therethrough the sidewalls. A winch cable 250 can be attached to a ring 340 that is fixed to a bucket plate 320 by a plurality of bucket cables 310 that connect to a front end of the bucket 300.

Figure 13:
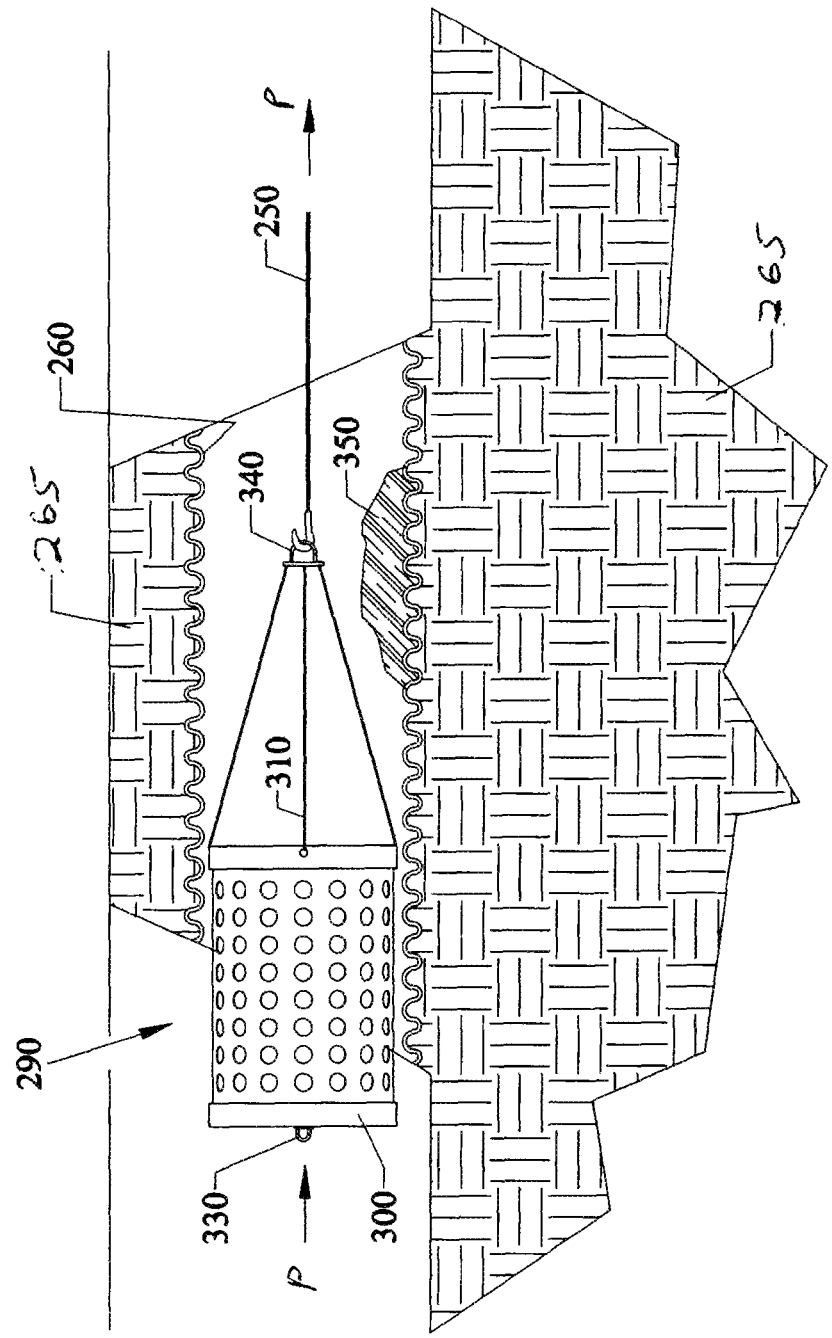
FIG. 13 is a cross-sectional view of an old damaged culvert with the installation showing cleaning bucket being pulled through to clear debris.
Figure 14:
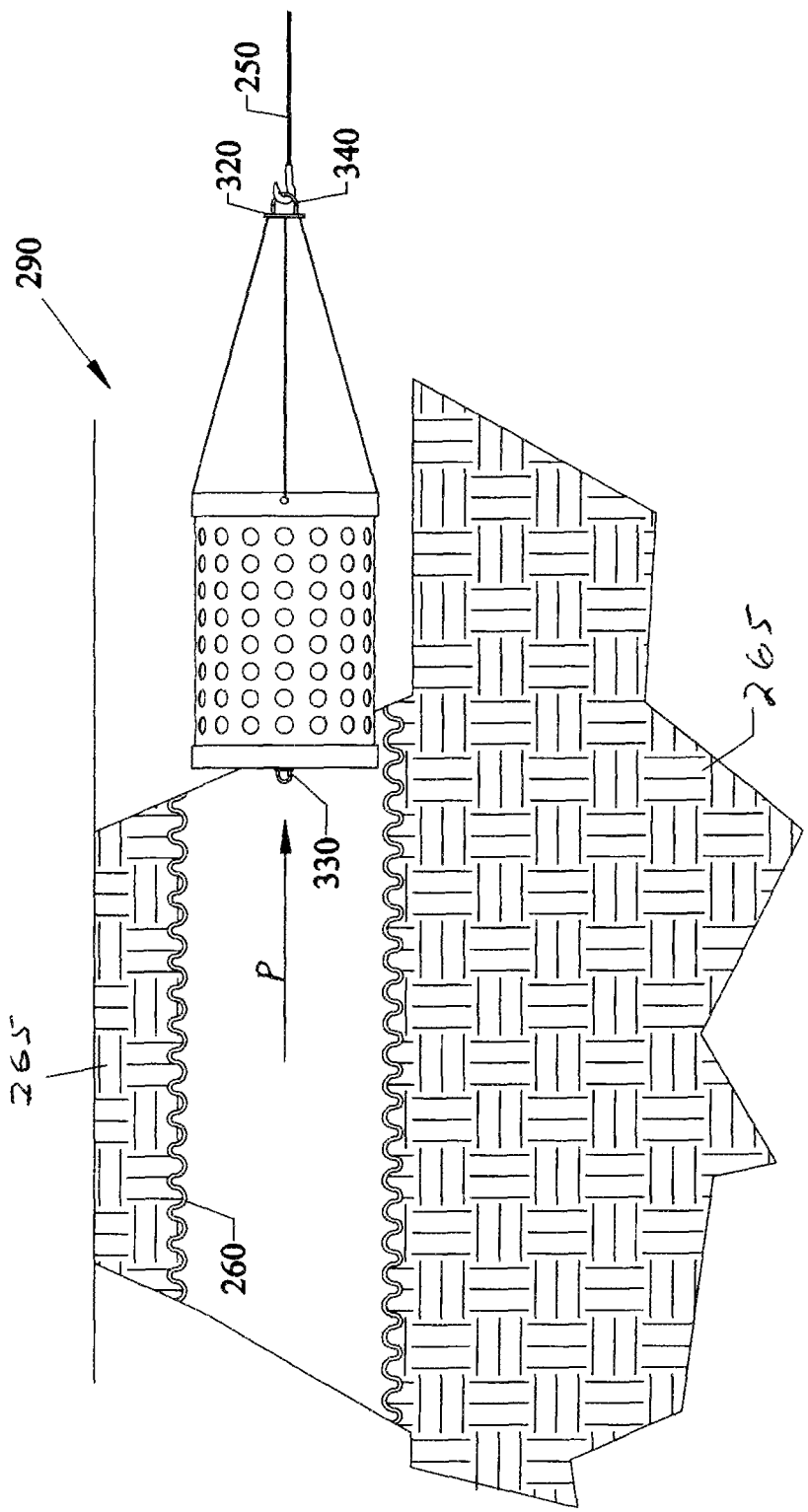
FIG. 14 is a cross-sectional view of an old damaged culvert showing the bucket pulled completely through and debris cleared.

FIG. 13 is a cross-sectional view of an old damaged culvert 260 with the installation showing cleaning bucket 300 being pulled through the damaged culvert 260 to clear debris. FIG. 14 is a cross-sectional view of an old damaged culvert showing the bucket pulled completely through and debris 350 cleared. The pipe cleaning bucket 290 can be pulled through the damaged culvert 260 cleaning debris 350 out of the way in order to allow for the culvert insert 10 to be used.

The embodiment describes a seam pre-attached to one side of the strip 110, the invention can be formed from extruded and/or a molded and/or welded and/or machined on hook edge of the strip.

While PVC and ABS plastic are described, the invention can be formed from other types of material such as but not limited to CPVC (chlorinated polyvinyl chloride) that has the ability to bend, shape and weld, and the like, as well as be fire retardant can be used. Other types of material can also be used that can provide good structural and memory capability can also be used.

Although a lock has been described to keep the spiral strip in a tube configuration, other types of components, such as bands, and the like, can be used.

While an O-ring has been described, the invention can be used with other types of depressible and slidable components, such as but not limited to bushings and Teflon coatings.

Although the primary applications refer to culverts, the invention can be used in other types of channels, such as but not limited to storm drains, sewer lines, septic inlet and outlet pipes.

Although the invention shows straight channels, culverts, the invention can be used in channels and culverts that have bends, and the like.

Pipe inserts can be joined to each other end to end by a coupler, having a male protruding end and a female receiving end. This would allow for greater lengths of damaged culverts to be repaired. Additionally, the coupling can allow for turns and bends in a damaged culvert.

Although a bridle and winch has been described as pulling the insert into a damaged culvert, other insertion methods and techniques can be used. For example, if the damaged culvert is filled with water, the insert can be floated into position with floats, such as but not limited to buoys or air bags, and the like. Alternatively, another method of installation can allow for the insert to be pushed in by a shovel type truck or shovel type machine, and the like.

While the invention refers to hook edges to form the seams, the invention can be used with other types of slidable/moveable seams, such as but not limited to using shifting/sliding tracks. For example, T or L type members can be slidable within a mateable channel member. Although the finger is described as a longitudinal protruding hook, the finger can be more than a single finger, and can include spaced apart fingers, and the like.

Although a mechanical lever is described, a machine operated torqueing wheel which can be inserted into one end of the insert, with outwardly protruding spokes which pass into the holes in the insert. Rotating the wheel counter-clockwise would assist in expanding the diameter of the insert. For example, up to approximately an 18 degree twist can be all that is needed to twist the insert from a contracted position to an expanded position. Twisting can be at one end or both ends of the insert as needed to expand or contract the diameter of the insert.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A culvert insert comprising:
   an elongated rectangular strip of semi-rigid planar material formed in a spiral wrapped tube configuration having an upper face surface and a lower face surface with a first longitudinal side and a second longitudinal side;
   a seam having an H shape with a first pair of spaced apart parallel protruding arms, which are perpendicular to and extend sideways from a wall, and a second pair of spaced apart parallel protruding arms which are perpendicular to and extend sideways from the wall facing opposite to the first pair of arms, the second pair of parallel protruding arms being fixably attached to the first longitudinal side of the elongated rectangular strip,
   the first pair of parallel protruding arms extending sideways away from the first longitudinal side of the elongated rectangular strip, the first pair of parallel arms having a first protruding hook with having an end attached to one of the protruding arms and a free end extending toward another of the protruding arms; and
   a longitudinal groove running through at least one of the upper face and the lower face adjacent to the second longitudinal side of the rectangular strip, where the second longitudinal side is sandwiched between the first pair of protruding arms limiting substantial lateral movement of the second longitudinal side, and the first protruding hook slidably attaches to and slides within the longitudinal groove as the strip is rolled and unrolled into the spiral wrapped tube configuration.

2. The culvert insert of claim 1, wherein the elongated rectangular strip is formed from polyvinyl chloride (PVC).

3. The culvert insert of claim 1, further comprising:
   a depressible and slidable component for allowing the first longitudinal side to slide against the second longitudinal side of the strip.

4. The culvert insert of claim 1, wherein the first protruding hook includes:
   a finger portion protruding substantially perpendicular to the upper face and lower face of the rectangular strip.

5. The culvert insert of claim 4, wherein the finger portion includes:
   a substantially sharpened tip.

6. The culvert insert of claim 4, wherein the finger portion includes:
   a substantially rounded tip.

7. The culvert insert of claim 1, wherein the first protruding hook includes:
   a finger portion protruding at an angle toward the upper face and the lower face of the rectangular strip.

8. The culvert insert of claim 1, wherein each of the first pair of protruding arms has a protruding hook attached to an end thereof and each hook has a finger portion with a free end, with each of the free ends facing one another; and the longitudinal groove includes a first groove on the upper face of the rectangular strip and a second groove on the lower face of the rectangular strip with one of the free ends of the first pair of finger portions slidably located in the first groove and another of the free ends of the first pair of finger portions slidably located in the second groove.

9. A method of repairing a damaged culvert, comprising the steps of:
   providing a rectangular strip of a semi-rigid material in a spiral configuration;
   providing an H shaped seam with a first pair of spaced apart parallel protruding arms, which are perpendicular to and extend sideways from a wall, and a second pair of spaced apart parallel protruding arms which are perpendicular to and extend sideways from the wall facing opposite to the first pair of arms;
   fixably attaching the second pair of parallel protruding arms from the H shaped seam to one side of the rectangular strip
   slidably sandwiching and attaching another side of the rectangular strip to with the first pair of parallel protruding arms from the H shaped seam, limiting substantial lateral movement of the rectangular strip;
   wrapping the rectangular strip with the slidable H shaped seam into a rolled up tube having a first end and a second end;
   attaching one end of bridle lines adjacent to the first end of the rolled up tube;
   passing a second end of the bridle lines through the rolled up tube to extend out from the second end of the rolled up tube;
   pulling the rolled up tube by the second end of the bridle lines into a damaged culvert;
   releasing the rolled up tube to unravel;
   expanding the unraveling tube; and
   locking the expanding tube to interior walls of the culvert in order to form a protective lining for interior walls of the damaged culvert.

10. The method of claim 9, further comprising the step of:
    slidably interlocking protruding hook within a longitudinal groove while the strip is being rolled into the spiral shape.

11. The method of claim 10, further comprising the step of providing a slidable surface on the hook edges, the slidable surface being selected from one of an O-ring, a bushing and a slidable coating.

12. The method of claim 9, wherein the releasing step includes the step of:
    removing a lock from the at least one end of the rolled up tube.

13. The method of claim 9, further comprising the step of slidably attaching a hook into an elongated groove.

14. The method of claim 13, wherein the hook include:
    a substantially perpendicular finger portion.

15. The method of claim 13, wherein the hook edges include:
    a pair of substantially perpendicular finger portions each facing one another.

16. A culvert insert comprising:
    a pipe having a cut along a spiral from one end of the pipe to an opposite end of the pipe, where the spiral cut forms a seam line between spiral cut sections of the pipe;
    an H shaped seam with a first pair of spaced apart parallel protruding arms which are perpendicular to and extend sideways from a wall, and a second pair of spaced apart parallel protruding arms which are perpendicular to and extend sideways from the wall facing opposite to the first pair of arms, the second pair of parallel protruding arms being fixably attached to one side of the seam line between the spiral cut sections of the pipe, where another side of the seam line is sandwiched between the first pair of protruding arms limiting substantial lateral movement of the seam line,
    at least one hook protruding from one of the first pair of arms toward the another of the first pair of arms; and
    a longitudinal groove running lengthwise along another side edge of the spiral cut section, the protruding hook being slidably received within the longitudinal groove across the seam line, wherein twisting the insert in one direction expands the diameter of the insert, and twisting in an opposite direction contracts the diameter of the insert.

* * * * *